Figures 1, 2:
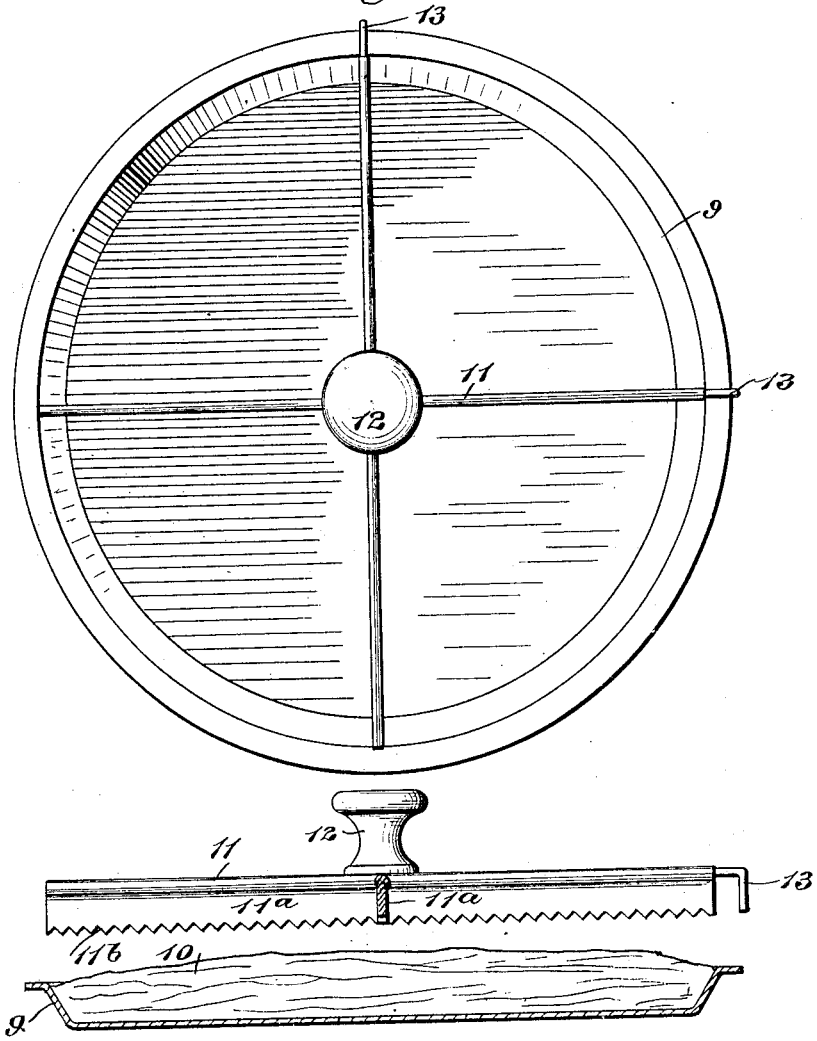

No. 869,666. PATENTED OCT. 29, 1907.
C. SULLIVAN.
PIE MARKER.
APPLICATION FILED JULY 3, 1906. RENEWED MAY 6, 1907.

Catherine Sullivan
Inventor

Witnesses
M. A. Schmidt
G. E. Tew

By Milton Stewart & Co.
Attorneys

UNITED STATES PATENT OFFICE.

CATHERINE SULLIVAN, OF CHICAGO, ILLINOIS.

PIE-MARKER.

No. 869,666.  Specification of Letters Patent.  Patented Oct. 29, 1907.

Application filed July 3, 1906. Serial No. 324,581. Renewed May 6, 1907. Serial No. 372,030.

*To all whom it may concern:*

Be it known that I, CATHERINE SULLIVAN, a citizen of the United States, residing at Chicago, in the county of Cook and State of Illinois, have invented new and useful Improvements in Pie-Markers, of which the following is a specification.

This device is a pie marker intended to mark the top of a pie so as to indicate where the cuts are to be made so as to divide the pie into equal portions, as for instance four pieces. It may also be used for marking layer cakes or other bakery goods so as to indicate the proper cutting of the same.

In the drawings, Figure 1 is a plan view of the device showing the marker arranged above a pie plate. Fig. 2 is a sectional elevation of the same, showing the marker above the pie and ready to mark the same.

Referring specifically to the drawings, 9 indicates a pie plate, and 10 a pie. The marker has a series of radial arms 11, preferably four, arranged in cross shape. Any number of arms may be used so as to cut the pie or cake into any desired number of sections. The arms 11 have blades 11$^a$ provided with serrations or teeth 11$^b$ on their lower edges. These teeth are for marking on top of the pies, pastry, etc. indications to show where the same are to be cut.

12 is a button or knob attached centrally to the marker and is for lifting or depressing the marker on the pie.

The outer ends of two of the arms 11 are each provided with a guide 13, consisting of an angular or hook shaped piece of wire having a pendent portion which overlaps or engages the rim of the pie plate and thus serves to center and guide the marker during the operation of marking the pie. In use the hooks are engaged against the rim and the marker is then pushed down upon the pie. Instead of having teeth, the lower edges of the blades may be sharpened to cut the pie.

I claim:

A pie marker consisting of a set of radial blades, two of which are provided with downwardly projecting hooks at their outer ends.

In testimony whereof I have signed my name to this specification in the presence of two subscribing witnesses.

CATHERINE SULLIVAN.

Witnesses:
SIGNA FELTSKOG,
H. G. BATCHELOR.